United States Patent
Peña-Parás et al.

(10) Patent No.: US 11,130,925 B2
(45) Date of Patent: Sep. 28, 2021

(54) LUBRICATING COMPOSITION BASED ON CARBON NANOTORI

(71) Applicants: UNIVERSIDAD DE MONTERREY, Monterrey (MX); Oxana Vasilievna-Kharissova, Monterrey (MX); Patsy-Yessenia Arquieta-Guillén, Guadalupe (MX)

(72) Inventors: Laura Peña-Parás, Nuevo León (MX); Demófilo Maldonado-Cortés, Nuevo León (MX); Oxana Vasilievna-Kharissova, Monterrey (MX); Patsy-Yessenia Arquieta-Guillén, Guadalupe (MX)

(73) Assignee: UNIVERSIDAD DE MONTERREY, Monterrey (MX)

( * ) Notice: Subject to any disclaimer, the term of this patent is extended or adjusted under 35 U.S.C. 154(b) by 0 days.

(21) Appl. No.: 16/176,539

(22) Filed: Oct. 31, 2018

(65) Prior Publication Data
US 2019/0382677 A1 Dec. 19, 2019

(30) Foreign Application Priority Data
Jun. 15, 2018 (MX) .................. MX/A/2018/007630

(51) Int. Cl.
| | | |
|---|---|---|
| *C10M 125/02* | (2006.01) | |
| *C10M 173/02* | (2006.01) | |
| *C10M 125/04* | (2006.01) | |
| B82Y 30/00 | (2011.01) | |
| C10N 10/14 | (2006.01) | |
| C10N 20/06 | (2006.01) | |
| C10N 30/06 | (2006.01) | |
| C10N 50/00 | (2006.01) | |

(52) U.S. Cl.
CPC ........ *C10M 125/02* (2013.01); *C10M 125/04* (2013.01); *C10M 173/02* (2013.01); *B82Y 30/00* (2013.01); *C10M 2201/02* (2013.01); *C10M 2201/041* (2013.01); *C10M 2201/05* (2013.01); *C10N 2010/14* (2013.01); *C10N 2020/06* (2013.01); *C10N 2030/06* (2013.01); *C10N 2050/015* (2020.05)

(58) Field of Classification Search
CPC .............. C10M 125/02; C10M 173/02; C10M 125/04; C10M 2201/041; C10M 2201/02; C10M 2201/05; C10N 2250/12; C10N 2220/082; C10N 2210/08; C10N 2230/06; B82Y 30/00
See application file for complete search history.

(56) References Cited

U.S. PATENT DOCUMENTS

2006/0099135 A1 * 5/2006 Yodh ...................... B82Y 10/00
423/447.1

FOREIGN PATENT DOCUMENTS

WO WO-03106600 * 12/2003

\* cited by examiner

*Primary Examiner* — Cephia D Toomer
(74) *Attorney, Agent, or Firm* — Nixon & Vanderhye

(57) ABSTRACT

A carbon nanotori-based lubricant composition for tribological applications, specifically for use in machining operations, which includes distilled water and a specific content of carbon nanotori having specific properties, which make them suitable for proper dispersal in distilled water without precipitation and remaining stable for a long time in dispersion without the need to add surfactants.

11 Claims, No Drawings

LUBRICATING COMPOSITION BASED ON CARBON NANOTORI

FIELD OF THE INVENTION

The present invention relates to lubricant compositions comprising carbon-based nanoparticles, and more particularly to a lubricant comprising carbon nanotori for manufacturing and processing of parts in industry applications.

BACKGROUND OF THE INVENTION

Today, there is a great deal of concern about the optimal use of energy in modern industrial processes.

In a mechanical system, friction is the main cause of energy loss, which has to be compensated with a greater energy expenditure in order to overcome friction losses. Therefore, the use of good quality lubricants in a mechanical system with elements that rub against each other is essential [1].

The concept of nanofluids emerged in the 1950's, when it was discovered that the use of nanoparticle dispersions in fluids offered the potential to significantly improve the tribological and thermal properties of said fluids [2].

Among the most important advances in lubricants is the use of nanoparticles of various types of materials either as main components of the lubricant or as an additive for various types of lubricants to improve their tribological properties, which are called nanolubricants [3].

There are several types of nanoparticles that are used as additives to improve the tribological properties of lubricants. A type of nanoparticle that has been specially studied for use as an additive to improve the tribological properties of lubricants, includes carbon nanotubes, which comprise one or more layers of graphene coiled in a hollow cylinder [4]. Carbon nanotubes have outstanding mechanical properties such as the ability to withstand extreme pressures [5].

Examples of the use of carbon nanotubes to enhance the tribological properties of fluids are described in the following prior art documents: U.S. Pat. No. 6,828,282, WO/2017/060919, U.S. Pat. No. 8,469,118, WO/2012/042406 and 20140274830.

Another type of nanoparticles recently studied are carbon nanotori, which consist of carbon nanotubes connected at their ends [6]. It has been found that carbon nanotori exhibit a great variety of properties such as: great flexibility, high resistance in proportion to their density, tensile strength, also appreciating a high magnetic moment when electrons flow in their structure [7].

Currently, there is no reference in the state of the art about the use of carbon nanotori to improve the tribological properties of a fluid.

Patent application 20060099135 discloses a dispersion comprising: an aqueous medium; carbon nanotubes; and at least one surfactant comprising an aromatic group, an alkyl group having from about 4 to about 30 carbon atoms, and a charged head group, wherein the carbon nanotubes can comprise single-walled carbon nanotubes, multi-walled carbon nanotubes, armchair carbon nanotubes, zigzag carbon nanotubes, chiral carbon nanotubes, carbon nanofibers, carbon nanotori, branched carbon nanotubes or any combination thereof.

It is described that the dispersion described in patent application 20060099135 may include carbon nanotori and an aqueous medium, however, the results shown and described in said patent application focus on the use of carbon nanotubes and not carbon nanotori, and the use of such dispersion is not described or suggested for tribological applications. Additionally, the dispersion additionally comprises a specific surfactant, which is necessary to maintain a uniform mixture of the nanoparticles.

In view of the above, after applying a research and development process, the applicant found that the addition of carbon nanotori to a fluid significantly increased its tribological properties, which, as indicated above, has not been investigated or suggested by experts in the field so far.

As a result of said research and development process, and also seeking to obtain an environmentally friendly lubricant composition, the applicant further developed a water-based composition comprising carbon nanotori that does not require dispersing agents, which is useful for use in tribological applications, such as manufacturing and processing of parts in industry.

The lubricant composition developed by the applicant has antifriction, and anti-wear properties, and a high resistance to extreme pressures before the lubricant film is broken.

The lubricant composition of the present invention comprises distilled water and a specific content of carbon nanotori which are adequately dispersed in distilled water without precipitation and remaining stable for a long time in dispersion without the need to use surfactants or dispersing agents.

Additionally, the present invention comprises a method for the production of the lubricant composition of the present invention.

SUMMARY OF THE INVENTION

It is therefore a primary objective of the present invention to claim the use of carbon nanotori in fluids to improve their tribological properties.

It is another primary objective of the present invention, to provide a water-based lubricant composition comprising carbon nanotori for tribological applications, such as serving as lubricant fluid in the manufacturing or processing of parts in the industry.

It is still another primary objective of the present invention, to provide a lubricant composition of the nature described above, which needs no dispersing agents, does not precipitate and has high stability.

It is an additional objective of the present invention, to provide a lubricant composition of the nature described above, which comprises distilled water and a specific content of carbon nanotori which are properly dispersed in distilled water without precipitation, being able to maintain long term stability in dispersion without the need to add surfactants or dispersing agents.

It is another additional objective of the present invention to provide a lubricant composition of the nature described above, having anti-friction, and anti-wear properties, has a high resistance to extreme pressures before the lubricant film is broken.

It is a still another additional objective, to provide a method for the production of the lubricant composition of the present invention.

These and other objectives and advantages of the present invention will become apparent to those of ordinary skill in the art from the following detailed description of the invention.

DETAILED DESCRIPTION OF THE PREFERRED EMBODIMENTS

The present invention comprises the following aspects:
A lubricant composition of a water-based lubricant composition comprising carbon nanotori.

A method of production of the water-based lubricant composition.

The use of carbon nanotori in fluids to improve their tribological properties.

Regarding the first two aspects of the present invention, the water-based lubricant composition comprising carbon nanotori of the present invention has specific characteristics that provide optimum performance for lubrication applications in manufacturing and processing of industrial parts, wherein the lubricant composition of the present invention comprises:

distilled water at a purity of 100%;
carbon nanotori with a size between 3 and 500 nm dispersed in distilled water at a content of 0.1% to 2.0% by weight.

In a preferred embodiment of the present invention, the carbon nanotori are synthesized in accordance with a proprietary method described in the Mexican patent application No. MX/a/2017/002955 of O. V. Kharissova and P. Y. Arquieta-Guillen, "Method of synthesis of nanotori at low temperature," that uses as raw material multilayer carbon nanotubes containing nanoparticles within the nanotubes selected from the group comprising Ni, Co, Fe, or their alloys (FeNi, NiCo or FeCo), having a size of between 3 and 500 nm and magnetic properties that allow them to form a film on the metal surface to be lubricated, which are due to the peculiarities of the atomic structure which in turn can the effect of Aharonov-Bohm oscillations [8] and the existence of a magnetic moment in the carbon nanotoroi nanostructures at low temperatures.

The proprietary method for synthetizing the carbon nanotori of the lubricant composition of the present invention comprises the following steps:

a) mixing carbon nanotubes with an acid mixture comprising sulfuric acid, ($H_2SO_4$), and nitric acid under stirring (preferably magnetic stirring) during a time of between about 50 to 90 minutes at a temperature of between 18° to 24° C.;
b) doping of the mixture obtained in step a) with potassium permanganate ($KMnO_4$) under stirring (preferably magnetic stirring) at a temperature of between about 18 to 24° C. during a time of between 50 to 90 minutes;
c) heating the mixture obtained in step b) at a temperature of preferably 45° C. during a time of between about 5 to 45 minutes and;
d) washing the mixture obtained in step c) with a mixture of distilled water and hydrogen peroxide having a proportion of 4:1 of the total weight.

wherein the proportion of sulphuric acid, nitric acid, and potassium permanganate is 1:28-30: 1.8-2:3-3.5 of the total weight.

The carbon nanotori-based lubricant composition of the present invention provides the following advantages:

Up to a 950% increase in load-carrying capacity in relation to the distilled water.
The load from which scuffing starts to appear is increased to 1820N in relation to the distilled water.
The mass loss in the parts that are in friction was reduced by up to 96% in relation to the use of distilled water.
The friction coefficient was reduced by up to 76% in relation to the use of distilled water.
Stability of at least one year before the carbon nanotori begin to precipitate;
The carbon nanotori-based lubricant composition of the present invention is developed by a method comprising the following stages:

a) adding carbon nanotori in the distilled water at a purity of 100% in a content of 0.1% to 2.0% by weight;
b) dispersing the carbon nanotoroi content by ultrasound at a frequency between 10 kHz and 30 kHz, preferably 20 kHz for a time period between 1 and 10 min;

wherein the carbon nanotori are synthesized in accordance with the proprietary process described above, described above.

Performance Testing
Tribological Test of Load-Carrying Capacity Under Extreme Pressures.
Proven Compositions Six carbon nanotori-based lubricant compositions (produced by the method of the Mexican patent application No. MX/a/2017/002955) were prepared using the method described above with concentrations of 0.1, 0.5, 1.0, 1.2, 1.5 and 2.0% by weight respectively and with individual sizes of carbon nanotori of approximately 180 nm.

Equipment Used in the Tests

A four-ball T-02 tribometer was used, according to the Polish ITeE-PIB test method to test lubricants under scuffing conditions
Balls are made of AISI 52100 steel, with a diameter of 12.7 mm, a hardness of ~60 HRC and an $R_a$ of 0.28 μm.
Five tests were performed for each lubricant composition. Balls are made of AISI 52100 steel, with a diameter of 12.7 mm, a hardness of ~60 HRC and an $R_a$ of 0.28 μm.

Characteristics of the Tests

Number of tests performed for each of the lubricant compositions: five.
Lubricant compositions are subjected to a load that increases linearly from 0 to 7200 N, with a rotation speed of 500 rpm, at a temperature of 25° C., for 18 s.

Considerations and Procedures for Determining Results

Determination of scuffing load $P_t$: it occurs when a sudden increase in friction torque (frictional torque) appears in the long term.
Load-carrying capacity definition ($P_{oz}$): it is the load that occurs when the friction torque generated reaches 10 N·m and the lubricant film breaks.
If lubricant depletion (or metal-metal contact) does not occur at the end of the run, the $P_{oz}$ is considered to be 7200N.
Wear scar diameter (WSD) of the three lower balls is measured by optical microscopy and the average in mm is used to calculate the load-carrying capacity ($p_{oz}$) of the lubricant according to equation 1:

$$p_{oz} = 0.52 P_{oz}/WSD^2 \qquad \text{Equation 1}$$

Results of the Tribological Tests

Main characteristics that were improved:
Delay in the start of scuffing of the balls.
Decrease in the frictional torque value of the friction torque.
Decrease in the WSD;
The above improvements resulted in a higher value of load-carrying capacity $p_{oz}$.

Results of Friction Torque

TABLE 1

| Friction torque | |
| --- | --- |
| Percentage by weight of nanotori in distilled water | Friction torque |
| 0.1 to 1.0% | Approximately 12 N.m. |
| Greater than 1.2% | Maximum of 6 N.m. |

TABLE 2

| Percentage by weight of nanotori in distilled water | Test time from which scuffing started to appear (seconds) |
|---|---|
| 0% Distilled water only | 2.3 s |
| 0.1%, 0.5%, 1.0% | From about 2.3 s to 3.2 s |
| 1.2%, 1.5%, 2.0% | About 4.6 s |

Scuffing start time where a strong increase in the friction torque appears

Results in the Scuffing Load $P_t$

The minimum scuffing load Pt (N), occurred for the distilled water in ~800 N while the maximum occurred for a lubricant containing 2.0% of carbon nanotori. The depletion load, $P_{oz}$, was found at ~3000 N for distilled water; with 0.1% by weight, 0.5% by weight and 1.0% by weight increased to ~3040 N, 3600 N and 4020 N, respectively. No depletion of the lubricant composition was found for concentrations of 1.2-2.0% by weight, so the depletion load was 7200 N, which is the maximum load of the test.

In worn steel balls tested with a) distilled water, b) 0.5% by weight of carbon nanotori, c) 1.0% by weight of carbon nanotori, d) 1.0% by weight of carbon nanotori, a decrease in the wear scar diameter (WSD) was obtained as the concentration of carbon nanotori increased.

Results in the Load-Bearing Capacity ($p_{oz}$)

The load-carrying capacity ($p_{oz}$) results calculated with equation 1, comprise load-carrying capacity values (also called contact limit pressure) which are given in N/mm² and were compared against various concentrations by weight of nanotori, specifically 0.0 (distilled water only), 0.5%, 1.0%, 1.5% and 2.0%.

The $p_{oz}$ minimum value was found for water, with a value of ~225 N/mm², while the highest value of ~2360 N/mm² (an increase of 950%) was reached with 2.0% by weight. When carbon nanotori were added to distilled water at concentrations of 0.1-1.0% by weight according to the present invention, it ranged from 300-350 N/mm². In this regard, a peak was found in the increase of the loss limit pressure when the concentration increased above 1.2% by weight with a load-carrying capacity of ~2300 N/mm².

In contrast, when synthetic-based lubricants were subjected to the same test method, such as PAO8 lubricant, $p_{oz}$ values of 230 N/mm² [9] were found. Similarly, API GL-4 (a fully formulated oil), has shown a $p_{oz}$ of 1800 N/mm² [10], therefore the results obtained in this invention are significantly higher.

Anti-Friction Test Properties
Equipment Used in the Tests
  Block friction testing system on a constantly rotating ring.
  JEOL JSM-6010PLUS/LA (SEM) scanning electron microscope coupled to an energy dispersive spectroscopy (EDS) detector to determine the possible tribological mechanism of carbon nanotori.
  The blocks are made of AISI D2 steel
  The rings are made of AISI D2 steel
  The $R_a$ of both the rings and the blocks was 0.650 μm.
Characteristics of the Tests
  Load of the test 245 N.
  Contact pressure 325 MPa.
  Ring rotation speed: 300 RPM.
  Duration of the 1200s test.
Considerations and Procedures for Determining Results
  The loss of wear mass of the blocks was calculated by weighing the samples before and after each test.
  The mass loss and friction coefficient was obtained for each test.
Results of the Anti-Friction Properties Tests
Loss of Wear Mass
  The size of wear scars on worn blocks was measured after undergoing the block on ring test tested with:
    Distilled water.
    A lubricant composition with 0.5% by weight of carbon nanotori.
    A lubricant composition with 2.0% by weight of carbon nanotori.
  The results obtained are shown in Table 3

TABLE 3

| | Size of wear scars | | |
|---|---|---|---|
| | 0% (distilled water only) | 0.5% by weight of carbon nanotori | 2.0% by weight of carbon nanotori. |
| Size of wear scars | 2.95 mm | 1.25 mm | 0.72 mm |

Regarding the loss of wear mass in mg for lubricant compositions having:
  0% by weight of carbon nanotori (distilled water).
  0.1% by weight of carbon nanotori.
  0.5% by weight of carbon nanotori.
  1.0% by weight of carbon nanotori.
  1.2% by weight of carbon nanotori.
  1.5% by weight of carbon nanotori.
  2.0% by weight of carbon nanotori.
  It was found that lubricant compositions with all concentrations of carbon nanotori were able to decrease the loss of wear mass by up to 96% for the 2.0% concentration by weight of carbon nanotori compared to distilled water.
Friction Coefficient
  The friction coefficient (COF, μ) was measured in accordance with the time of the block-on-ring test for the following lubricant compositions:
    0% by weight of carbon nanotori (distilled water).
    0.1% by weight of carbon nanotori.
    0.5% by weight of carbon nanotori.
    1.0% by weight of carbon nanotori.
    1.2% by weight of carbon nanotori.
    1.5% by weight of carbon nanotori.
    2.0% by weight of carbon nanotori.
  Lower friction coefficient values were obtained as the concentration of carbon nanotori increases and for the use of distilled water only, very high initial friction coefficient values were obtained at the beginning of the test (above 1.6) decreasing with time (up to approximately 0.4), probably due to the polishing of the surfaces over the duration of the test.
  The friction coefficient for lubricant compositions with any of the concentrations by weight of carbon nanotori, was very small (below 0.4 in all cases at the beginning of the test), showing its effectiveness by separating both surfaces in friction.
  Significant reductions are observed with a maximum of approximately 76% reduction for a 1.5% concentration by weight of carbon nanotori.
Surface Analysis
Surface Analysis of the Balls Subjected to the Tribological Test of Load-Carrying Capacity Under Extreme Pressures.
  The surface analysis was carried out on the balls subjected to the tribological test of load-carrying capacity under extreme pressures.

An Alicona IF-EdgeMaster 3D optical surface measurement system was used to measure the surface roughness of the worn materials on lubricated ball surfaces with the following lubricant compositions:
Distilled water only.
1% by weight of carbon nanotori.
2% by weight of carbon nanotori.

The surface roughness profiles are taken in the worn area of the steel balls.

The average surface roughness of the worn steel balls is shown below:

It should be noted that the highest values of wear are obtained with distilled water, in this case the adhesive type since metal-metal contact exists.

In the 1% weight concentrations of nanotori there is only a little of adhesive wear as a result of frictional torque values less than 6 Nm which causes lower roughness values (~2.7 μm) which is equivalent to a 25% reduction in relation to distilled water.

When the weight percentage is increased to 2% the wear is less severe and resembles a superficial scratching or scuffing. This type of wear is a consequence of a permanent presence of the lubricant film, therefore the reported roughness values decrease considerably until reaching values of ~0.4 μm, that is to say, 90% decreases if we compare it to the value reached when only distilled water is used. A probable cause of this is the exfoliation of the carbon nanotori when generating a film between the surfaces when we have weight concentration values of 2%.

Table 4 shows the energy dispersive spectroscopy (EDS) analysis for the samples, specifically regarding the carbon content located in the wear area wherein it is observed that the percentage of carbon increases as the percentage by weight content of carbon nanotori increases.

TABLE 4

Spectroscopy analysis of the worn test tubes of extreme loads

| % by weight of carbon nanotori | Increase in % of carbon content in the wear area compared to distilled water |
|---|---|
| Distilled water (DW) | — |
| DW + 1.0% weight of carbon nanotori | 58% |
| DW + 2.0% weight of carbon nanotori | 104% |

Surface Analysis of the Block Subjected to the Anti-Wear Properties Test.

The surface analysis was carried out on the block subjected to the anti-friction test on the rotating ring.

An Alicona IF-EdgeMaster 3D optical surface measurement system was used to measure the surface roughness of the worn materials.

3D images of the rubbed surfaces of the blocks subjected to the anti-friction test on the rotating ring, lubricated with the following lubricant compositions, were analyzed:
Distilled water only.
1% by weight of carbon nanotori.
2% by weight of carbon nanotori.

The surface roughness profiles are taken in the worn area of the steel blocks.

The average surface roughness of the worn steel blocks is shown below.

Qualitative analysis of the images shows roughness values of ~0.9 μm with an adhesive type wear when using distilled water.

The use of nanotori in weight percentages of 0.1% generates a drastic reduction in the wear and an increase in the roughness quality by having values of ~0.3 μm when using a 2% weight of nanotori in distilled water, this represents a benefit of 66%.

An analysis of the energy dispersive spectroscopy and carbon analysis images of the worn area was then performed on the blocks with the following lubricating conditions:
Distilled water only.
1% by weight of carbon nanotori.
2% by weight of carbon nanotori.

Table 5 shows the energy dispersive spectroscopy (EDS) analysis for the samples, specifically regarding the carbon content contained in the wear area wherein it is observed that the percentage of carbon increases as the percentage by weight content of carbon nanotori increases.

TABLE 5

Spectroscopy analysis of the worn anti-wear test tubes

| % by weight of carbon nanotori | % of increase in carbon content in the wear area in relation to distilled water |
|---|---|
| Distilled water (DW) | — |
| DW + 1.0% weight of carbon nanotori | 45% |
| DW + 2.0% weight of carbon nanotori | 146% |

The percentage of carbon is generally higher in the tribological tests of load-carrying capacity under extreme pressures, which reinforces the theory that at extreme pressures, the nanoparticles of carbon nanotori undergo some exfoliation and deposition on the worn surface helping to improve the tribological properties.

Conclusions of the Tests Carried Out.
In extreme pressure analyses, nanolubricants showed excellent dispersion and stability of nanoparticles without the use of surfactants.
The tribological tests showed a decrease in the friction torque and a delay in the start of scuffing with concentrations of nanoparticles of 1.2-2.0% by weight.
The scuffing load, the load-carrying capacity and the loss limit pressure of distilled water also increased by 114%, 143%, 950%.
These benefits are attributed to the development of a film that separates contact surfaces and consequently to the reduction of wear.
The same behavior was shown for the anti-wear analysis. As the % by weight of carbon nanotori increased, the deposition of nanotori on the surface could explain the decreases in the friction coefficient, the wear and improvements in the surface roughness of the worn block area.

Tests for the Use of Carbon Nanotori in Other Types of Lubricant Fluids

A lubricant fluid was prepared by mixing 91% water with 9% water-soluble semi-synthetic concentrated lubricant.

In accordance with the prepared lubricant fluid, the following lubricants were subjected to tribological tests of load-carrying capacity under extreme pressures (four-ball test as described above):
Lubricant fluid.
Lubricant fluid+0.01% by weight of carbon nanotori.
Lubricant fluid+0.1% by weight of carbon nanotori.
Lubricant fluid+1% by weight of carbon nanotori.
Lubricant fluid+2% by weight of carbon nanotori.

The results obtained of load-carrying capacity ($p_{oz}$) are shown in table 6.

TABLE 6

Load-carrying capacity ($p_{oz}$) results

| | % by weight of carbon nanotori | $p_{oz}$ | Increase in the $p_{oz}$ |
|---|---|---|---|
| Lubricant fluid | 0 | 365.52 | — |
| Lubricant fluid + carbon nanotori | 0.01 | 446.57 | 22% |
| | 0.1 | 489.98 | 34% |
| | 1 | 669.24 | 83% |
| | 2 | 658.75 | 80% |

In all cases that carbon nanotori were added to the lubricant fluid, an increase in the $p_{oz}$ between 22% to 80% was observed for concentrations by weight of carbon nanotori between 0.01% to 2% by weight, showing the effectiveness of the use of carbon nanotori in other types of lubricant fluids.

Although the use of carbon nanotori in lubricant fluids including semi-synthetic lubricants is mentioned, it should be understood that carbon nanotori can also be used in any synthetic lubricant or other types of lubricant, resulting in improvements in the tribological properties thereof.

It should finally be understood that the carbon nanotori-based lubricant composition and its production method of the present invention is not limited to the embodiment described above and that experts in the field will be trained, by the teachings herein established, to effect changes in the carbon nanotori-based lubricant composition and its production method of the present invention, the scope of which will be established exclusively by the following claims.

REFERENCES

[1] Holmberg K, Erdemir A. Influence of tribology on global energy consumption, costs and emissions. Friction 2017; 5:263-84. doi:10.1007/s40544-017-0183-5.
[2] Choi SUS. Nanofluids: From Vision to Reality Through Research. J Heat Transfer 2009; 131:033106. doi: 10.1115/1.3056479.
[3] Saidur R, Leong K Y, Mohammad H a. A review on applications and challenges of nanofluids. Renew Sustain Energy Rev 2011; 15:1646-68. doi:10.1016/j.rser.2010.11.035.
[4] Varshney K. Carbon Nanotubes: A Review on Synthesis, Properties and Applications. Int J Eng Res Gen Sci 2014; 2:660-77.
[5] Ni B, Sinnott S B. Tribological properties of carbon nanotube bundles predicted from atomistic simulations. Surf Sci 2001; 487:87-96. doi:10.1016/S0039-6028(01) 01073-1.
[6] Delgado J L, Herranz M, Martin N. The nano-forms of carbon. J Mater Chem 2008; 18:1417. doi:10.1039/b717218d.
[7] Liu L, Zhao J. Toroidal and Coiled Carbon Nanotubes. Synth Appl Carbon Nanotub Their Compos 2013:257-81. doi:10.5772/51125.
[8] Kharissova O V, Yessenia P, Guillé A, Peña L, Maldonado D. Síntesis y aplicación tribologica de nanoestructuras a base de carbono tridimencionales n.d.:85.
[9] Peña-Parás L, Taha-Tijerina J, Garza L, Maldonado-Cortés D, Michalczewski R, Lapray C. Effect of CuO and Al2O3 nanoparticle additives on the tribological behavior of fully formulated oils. Wear 2015; 333:1256-61. doi: 10.1016/j.wear.2015.02.038.
[10] Peña-Parás L, Maldonado-Cortes D, Garcia P, Irigoyen M, Taha-Tijerina J, Guerra J. Tribological performance of halloysite clay nanotubes as green lubricant additives. Wear 2017; 376-377:885-92. doi:10.1016/j.wear.2017.01.044.

The invention claimed is:

1. A method for the production of the carbon nanotori-based lubricant composition comprising the stages of:
 a) providing distilled water;
 b) synthetizing carbon nanotori from multilayer carbon nanotubes having a size between 3 and 500 nm containing nanoparticles within the nanotubes selected from the group comprising Ni, Co, Fe, or their alloys (FeNi, NiCo or FeCo), by means of the following process:
  mixing carbon nanotubes with an acid mixture comprising sulfuric acid, (H2SO4), and nitric acid under stirring during a time of between about 50 to 90 minutes at a temperature of between 18° to 24° C.;
  doping of the mixture obtained in the previous step with potassium permanganate (KMnO4) under stirring at a temperature of between about 18 to 24° C. during a time of between 50 to 90 minutes;
  heating the mixture obtained in the previous step at a temperature of 45° C. during a time of between about 5 to 45 minutes and;
  washing the mixture obtained in the previous step with a mixture of distilled water and hydrogen peroxide having a proportion of 4:1 of the total weight;
  wherein the proportion of sulfuric acid, nitric acid, and potassium permanganate is 1:28-30:1.8-2:3-3.5 of the total weight,
 c) adding the carbon nanotori synthesized in step b) to the distilled water at a content of 0.1% to 2.0% by weight;
 d) dispersing the carbon nanotori content by ultrasound for a time period between 1 and 10 minutes.

2. The method according to claim 1, wherein the dispersion is performed by ultrasound at a frequency between 10 kHz and 30 kHz.

3. The method according to claim 1, wherein the carbon nanotori have a size between 3 and 500 nm.

4. A method for improving tribological properties of lubricant fluids, comprising adding to the lubricant fluid an effective amount of carbon nanotori, wherein the carbon nanotori are synthesized from multilayer carbon nanotubes having a size between 3 and 500 nm containing nanoparticles within the nanotubes selected from the group comprising Ni, Co, Fe, or their alloys (FeNi, NiCo or FeCo), by means of the following process:
 a) mixing carbon nanotubes with an acid mixture comprising sulfuric acid, (H2SO4), and nitric acid under stirring during a time of between about 50 to 90 minutes at a temperature of between 18 to 24° C.;
 b) doping of the mixture obtained in step a) with potassium permanganate (KMnO4) under stirring at a temperature of between about 18 to 24° C. during a time of between 50 to 90 minutes;
 c) heating the mixture obtained in step b) at a temperature of 45° C. during a time of between about 5 to 45 minutes and;
 d) washing the mixture obtained in step c) with a mixture of distilled water and hydrogen peroxide having a proportion of 4:1 of the total weight, wherein the proportion of sulphuric acid, nitric acid, and potassium permanganate is 1:28-30:1.8-2:3-3.5 of the total weight.

5. The method according to claim 4, wherein the lubricant fluids are selected from the croup comprising, but not limited to: distilled water, semi-synthetic lubricants, and synthetic lubricants.

6. The method according to claim 4 wherein the carbon nanotori have a size between 3 and 500 nm.

7. The method according to claim 1, wherein the dispersion is performed by ultrasound at a frequency of 20 kHz.

8. The method according to claim 1, wherein the step of mixing carbon nanotubes with an acid mixture comprising sulfuric acid, (H2SO4), and nitric acid is carried out under magnetic stirring.

9. The method according to claim 1, wherein the step of doping with potassium permanganate ($KMnO_4$), is carried out under magnetic stirring.

10. The method according to claim 4, wherein in step a) the mixing is carried out under magnetic stirring.

11. The method according to claim 4, wherein in step b) the doping is carried out under magnetic stirring.

\* \* \* \* \*